United States Patent [19]

Zuerner et al.

[11] Patent Number: 5,254,256

[45] Date of Patent: Oct. 19, 1993

[54] PROCESS FOR RECLAMATION AND TREATMENT OF PAINT OVERSPRAY TREATMENT COMPOSITIONS

[75] Inventors: Edwin C. Zuerner, Troy; Robert R. Petzeit; Norman Foster, both of Bloomfield Hills, all of Mich.

[73] Assignee: Nortru, Inc., Detroit, Mich.

[21] Appl. No.: 916,536

[22] Filed: Jul. 20, 1992

[51] Int. Cl.$^5$ .............................................. B01D 11/04
[52] U.S. Cl. .................................... 210/639; 210/708; 210/930; 252/312; 252/330; 95/189; 95/190
[58] Field of Search ............... 55/45, 85, 89; 252/312, 252/330; 210/634, 639, 708, 724, 725, 930; 427/331

[56] References Cited

U.S. PATENT DOCUMENTS

| | | | |
|---|---|---|---|
| 4,130,674 | 12/1978 | Roberts et al. | 427/331 |
| 4,265,944 | 5/1981 | Garner | 427/353 |
| 4,276,064 | 6/1981 | Gerdes | 55/217 |
| 4,289,505 | 9/1981 | Hardison et al. | 55/59 |
| 4,295,845 | 10/1981 | Sepulveda et al. | 8/139.1 |
| 4,339,248 | 7/1982 | Garner | 55/89 |
| 4,378,235 | 3/1983 | Cosper et al. | 55/85 |
| 4,396,405 | 8/1983 | Lindenberger et al. | 55/85 |
| 4,444,573 | 4/1984 | Cosper et al. | 55/37 |
| 4,504,395 | 3/1985 | Harpel et al. | 210/712 |
| 4,523,932 | 6/1985 | Cosper et al. | 55/85 |
| 4,554,026 | 11/1985 | Cosper et al. | 134/38 |
| 4,563,199 | 1/1986 | Lindenberger et al. | 55/85 |
| 4,750,919 | 6/1988 | Patzelt et al. | 55/45 |
| 4,780,235 | 10/1988 | Jackson | 252/170 |
| 4,812,255 | 3/1989 | Suwala | 252/142 |
| 4,814,092 | 3/1989 | Patzelt | 210/708 |
| 4,854,947 | 8/1989 | Patzelt | 55/85 |
| 4,919,691 | 4/1990 | Patzelt et al. | 55/45 |
| 4,927,556 | 5/1990 | Pokorny | 252/173 |
| 4,948,511 | 8/1990 | Swanson et al. | 210/634 |
| 4,948,513 | 8/1990 | Mitchell | 210/705 |
| 4,956,115 | 9/1990 | Van De Mark | 252/170 |
| 5,004,550 | 4/1991 | Beckman et al. | 210/930 |
| 5,019,138 | 5/1991 | Farrah et al. | 55/89 |
| 5,076,939 | 12/1991 | Hunter et al. | 210/712 |
| 5,084,200 | 1/1992 | Dishart et al. | 252/173 |
| 5,098,450 | 3/1992 | Patzelt et al. | 55/45 |

FOREIGN PATENT DOCUMENTS 50-91157  7/1975  Japan .................. 210/708

OTHER PUBLICATIONS

Eastman Chemicals Product Brochure for Texanol, Publication No. M158H, May, 1990.
Eastman Chemical Products, Inc. Material Safety Data Sheet "Texanol" Ester-Alcohol, May 19, 1989.
Eastman Chemical Products, Inc., Material Safety Data Sheet "Kodaflex" TXIB Plasticizer, Aug. 3, 1990.

*Primary Examiner*—Peter Hruskoci
*Attorney, Agent, or Firm*—Basile and Hanlon

[57] ABSTRACT

A process for treating spent aqueous emulsion material formed from a non-volatile hydrocarbon organic portion having a paint solids content greater than about 10% by weight in which the spent emulsion is broken and the organic phase is admixed with sufficient amounts of a hydrocarbon solvent extractant to extract organic portions of the aqueous emulsion. The hydrocarbon solvent extractant and the organic portion/solvent extractant mixture can then be distilled to provide essentially pure hydrocarbon solvent extractant and the hydrocarbon organic portion of the emulsion essentially free from paint solids. The organic portion of the material can then be admixed with quantities of water to reform a reclaimed emulsion. Examples of the paint overspray treatment emulsion on which the process of the present invention is highly effective is one which contains a hydrocarbon such as an alcohol ester, an alcohol ester derivative or mixtures of the two in combination in its organic phase.

28 Claims, No Drawings

PROCESS FOR RECLAMATION AND TREATMENT OF PAINT OVERSPRAY TREATMENT COMPOSITIONS

FIELD OF THE INVENTION

This invention is related to processes and methods for recovering and recycling the organic additives present in spent aqueous emulsions employed to treat air-borne paint overspray. The method of the present invention is also related to methods for the removal and isolation of entrained paint solids from overspray treatment compositions as well as to processes which render the aqueous portion of spent emulsions amenable to either reuse or disposal.

BACKGROUND OF THE INVENTION

Large quantities of paint of various kinds, including lacquers, varnishes, enamels, and certain specialty paints such as urethane-based paints, catalyzed two-component paints, base coat/clear coat combination paints, high solids enamels or lacquers, and the like, are used to coat finished products in industries such as automotive manufacture and the like. These paints, lacquers and varnishes are generally solvent-based; however, certain of these paints can be water-based. Some are considered low solids paints (i.e. materials containing about 20 to about 30% solids) while others are considered high solids paints (i.e. those containing above 50% solids).

These materials are generally sprayed onto the piece to be painted or coated in an enclosed area such as a paint spray booth. In this operation, substantial quantities of solvent and oversprayed paint are discharged into the spray booth and the air drawn therein. Paint spray booths provide a means for capturing and containing paint overspray components in a suitable liquid material.

Paint spray booths generally include a chamber, a duct system for passing air through the chamber, and a sump containing circulating liquid located in the bottom of the chamber which can be directionalized in the spray booth chamber to form a curtain of liquid to contact the over-sprayed paint particles and collect at least a portion thereof. The paint spray booth also contains a gas discharge means such as a stack for discharging excess air or gaseous material.

The liquid employed in paint spray booth applications is most preferably a hydrophilic material capable of removing solid particulates from the air. The liquid chosen is ideally economical, safe to use and capable of efficient and economical recycle and reuse. The hydrophilic material of choice typically is comprised of water to which various chemicals are added to provide detackifying properties. Water-based compositions are also desirable for their general ease and safe handling during operation and during spray booth clean-up and maintenance.

Various water-based treatment compositions have been proposed. Heretofore, oil-in-water formulations in which water, oil and various additives are combined to form a suitable emulsion have been employed as the hydrophilic liquid. The use of such oil-in-water emulsions is taught in U.S. Pat. No. 4,378,235, No. 4,396,405, No. 4,523,932, No. 4,563,199, No. 4,444,573, No. 4,544,026, No. 4,750,919, and No. 4,919,691.

These oil-in-water emulsions are generally weak alkaline emulsions which can be broken upon acidification. In order to reclaim such materials, a method such as that outlined in U.S. Pat. No. 4,919,691 to Patzelt can be employed in which predetermined amounts of spent emulsion are withdrawn from the paint spray booth for treatment. The emulsion is broken into separate organic, aqueous, and solid phases by adjusting the pH of the withdrawn portion to a level between about 3.0 and about 6.5; with even lower pH levels being employed in certain instances. At least a portion of the paint solids are recovered from the aqueous, organic and solid phases. The oil and other emulsion additives are, then, recovered for reuse in reformed emulsion material. At low pH levels, reaction can occur with the paint materials present in the emulsion material which can result in depolymerization of the paint materials and the evolution of formaldehyde and gaseous amines. In order to accomplish effective paint solid recovery, it has been necessary to employ less acid in combination with mechanical force to achieve effective breaks.

The use of oil-in-water emulsions has certain inherent difficulties. These emulsions are weak emulsions which are easily broken. In order to maintain the material in an emulsified state, it is necessary to employ emulsion stabilizing additives, paying close attention to composition pH, and in many instances, subjecting the material to continuous mechanical agitation. The oil-in-water systems are not highly effective solubilizing agents for paint solids. Thus, much study has been directed to finding additives which would enhance the emulsion stability and solubilizing power. Many of the patents previously enumerated provide various approaches for addressing some or all of the shortcomings inherent in oil-in-water emulsion systems.

Given the problems encountered with the various hydrophilic liquids previously available, there has been incentive for industry and manufacturers to either switch to alternative technologies or to develop some type of non-oil-based aqueous emulsion as an alternative treatment solution compatible with existing paint spray booth equipment. One such treatment solution is disclosed in U.S. application Ser. No. 07/790,650 which is currently pending before the United States Patent and Trademark Office and is incorporated by reference herein. The treatment solution disclosed therein consists essentially of a non-volatile hydrocarbon selected from the group consisting of alcohol esters, alcohol ester derivatives, and mixtures thereof, an emulsifying agent having an HLB value ranging from about 6 to about 40, and water. Such compositions have been found to exhibit a great capacity for containing paint either by solubilization, dispersion, or a combination of the two processes and are made up of chemically stable components which retain their effectiveness in composition for a protracted period of time.

While the alcohol ester paint overspray treatment composition is considered to be made up of components which could be easily separated and recovered, it has been found that oil-in-water emulsion recovery processes such as those disclosed in the Patzelt reference provide an unacceptably low percentage yield of reusable material. Unfortunately, much of the potentially reusable material remains contaminated with paint solids and the like. Furthermore, use of the process disclosed in the Patzelt reference on the aqueous emulsion of the present invention does not achieve the level of recovery efficiency desired.

Thus, it would be desirable to provide a process which would yield readily reusable organic products which can be easily reformulated with the necessary additives to form a recycled emulsion. It is also desirable to provide a process which would render paint solids in a form which could be easily disposed of or subjected to further post-treatment processes. It is also desirable to provide a process which can accomplish these objectives with a minimum of material addition.

SUMMARY OF THE INVENTION

The present invention is a process for the reclamation and recycle of aqueous emulsified compositions for treatment of oversprayed paints. Those compositions which are particularly amenable to treatment by the method of the present invention are those compositions consisting essentially of:

a. an effective amount of an essentially non-volatile hydrocarbon selected from the group consisting of alcohol esters, alcohol ester derivatives, and mixtures thereof; and b. water.

The process of the present invention comprises the steps of:

a) extracting the paint solid-laden organic phase derived from breaking the spent emulsion into its organic and aqueous phases with a quantity of a hydrocarbon solvent extractant sufficient to selectively extract the non-volatile hydrocarbon component employed in the aqueous emulsion to form an intermediate extract product; and b) separating the resulting intermediate extract product into a hydrocarbon solvent extractant fraction and a fraction containing the non-volatile hydrocarbon employed in the aqueous emulsion.

The fraction containing the non-volatile hydrocarbon can be used to reformulate additional aqueous paint overspray treatment emulsion for use in additional material.

DESCRIPTION OF THE PREFERRED EMBODIMENT

The process of the present invention can be employed to isolate and recover significant quantities of the chemical compound or compounds which constitute the organic phase of the treatment emulsion. The recovered compound or compounds derived from the initial paint overspray treatment emulsion can be employed to reformulate additional treatment emulsion once the paint solids contained therein are removed. The process of the present invention can be employed for removing and recovering large concentrations of paint solids from spent paint overspray treatment emulsions for appropriate re-use, re-processing or disposal. These recovered compounds can be treated and processed as necessary either for re-use or proper disposal. Finally, the process of the present invention also produces an aqueous phase consisting essentially of water derived from the aqueous phase of the spent emulsion which can be processed as necessary for re-use or proper disposal, use in other industrial processes, or recycle as an ingredient in an emulsion composition.

The process of the present invention comprises the steps of:

a) extracting the paint solid-laden organic phase derived from breaking a spent aqueous paint overspray treatment emulsion into its respective organic and aqueous phases, the extraction occurring with a quantity of a hydrocarbon solvent extractant sufficient to selectively extract the non-volatile hydrocarbon component employed in the aqueous emulsion into the solvent to form an intermediate extract product; and b) separating the resulting intermediate extract product into a hydrocarbon solvent extractant fraction and a fraction containing the non-volatile hydrocarbon employed in the aqueous emulsion.

The hydrocarbon solvent extractant fraction may be further processed to facilitate appropriate disposal or, preferably, reuse in reclaimed emulsion material as will be described in detail subsequently. In order to achieve greater recovery of the non-volatile hydrocarbon from the spent material, the process of the present invention may also include a second extraction step to be employed on the paint sludge material produced as a result of the emulsion break and the first extraction. The hydrocarbon solvent extractant may be any suitable solvent which is the same as or compatible with the hydrocarbon solvent extractant employed in the first extraction.

The recovered non-volatile hydrocarbon material is, preferably, reformulated into a reclaimed emulsion material by the addition and admixture of the recovered material with sufficient water together with any additives which may be necessary to give the reclaimed emulsion material certain chemical characteristics.

While it is envisioned that the process of the present invention can be employed to reclaim a variety of aqueous emulsion compositions employed to treat paint overspray, the process is particularly directed to the reclamation of spent emulsions which contain an organic solvent material, and an emulsifier in water. An example of one such emulsion system which can be treated and processed using the process of the present invention is that disclosed in U.S. application Ser. No. 07/790,650 which is currently pending before the United States Patent and Trademark office and is incorporated by reference herein. The paint overspray treatment emulsion disclosed therein consists essentially of the following:

a) an effective amount of an essentially non-volatile hydrocarbon selected from the group consisting of alcohol esters, alcohol ester derivatives, and mixtures thereof, the hydrocarbon being capable of dissolving paint and remaining essentially insoluble and non-reactive in an aqueous media;

b) an optional emulsifying agent having an HLB value between about 6 and about 40, with an HLB value between about 10 and about 30 being preferred; and C) water.

The alcohol ester or derivative thereof employed in the composition of the present invention is a material which is capable of dissolving paint but which is insoluble in an aqueous media. The term "dissolving" as employed herein is defined as a process which encompasses both dispersal and passing into solution or solubilization of paint. The term "insoluble" is defined as having a solubility index of less than 2 micrograms/liter.

The hydrocarbon employed in the present invention is selected from the group consisting of hydrocarbons having the general formula:

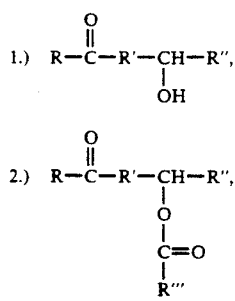

and mixtures thereof; wherein R' and R" are chosen from substituted and unsubstituted secondary alkyl groups having between 1 and 8 carbon atoms in the main chain; and R and R''' are chosen from linear or branched alkyl groups having between 1 and 10 carbon atoms wherein R and R''' may be either identical or different alkyl functionalities. In the preferred embodiment, R' and R" are chosen from the group consisting of unsubstituted ethyl, propyl, butyl, pentyl, and hexyl functionalities as well as the mono-,di-, and tri-alkyl substituted derivatives thereof such as methyl, propyl, methyl butyl, ethyl butyl, methyl propyl, dimethyl butyl, dimethyl pentyl, or trimethyl pentyl functionalities. R and R''' are chosen from the group consisting of propyl, isopropyl, butyl, isobutyl, or t-butyl functionalities.

Materials which can be successfully reclaimed by the process of the present invention generally have physical characteristics within the parameters set forth in Table I with a hydrocarbon selected from the group consisting of 2,2,4-trimethyl-1,3-pentanediol monoisobutyrate, 2,2,4-trimethyl-1,3-pentanediol diisobutyrate, and mixtures thereof being preferred.

TABLE I

| PHYSICAL CHARACTERISTICS OF HYDROCARBON | |
|---|---|
| Boiling point 200° to 300° C. | |
| Specific gravity (20° C.): | 0.94 to 0.955 |
| Water solubility insoluble | |
| Viscosity (20° C.): | 8 to 14 cP |
| Vapor pressure: | less than 0.01 mm (Hg at 20° C. and 1 atm) |

The compositions which can be successfully reclaimed by the process of the present invention generally have the hydrocarbon present in an amount from about 5 to about 50% by volume based on the total composition weight with the remainder being water. In actual usage, the alcohol ester comprises between about 5 and about 30% by volume with amounts between about 12 and about 18% by volume being preferred.

The composition of the present invention may also contain an emulsifying agent (i.e., emulsifier) having an HLB value ranging from about 6 to about 40, with a range from about 10 to about 30 being preferred.

The emulsifier employed provides effective emulsification of the alcohol ester or alcohol ester derivative in water.

The preferred hydrocarbons for use as emulsifiers in this invention are saturated and unsaturated carboxylic acids, alkaline metal salts of carboxylic acids, quaternary amine salts of carboxylic acids, and mixtures thereof. The carboxylic acids employed herein contain from about 12 to about 30, and preferably from about 6 to about 24 carbon atoms. These carboxylic acids assist in the formation of the improved dispersion or emulsion-like state of the composition of the present invention and permit easy breakage of the emulsion into its hydrophilic and hydrophobic component parts upon breakage of the emulsion, generally when acidified. These component parts are also easy to reform with mild mixing when the pH is readjusted to a range between about 7.5 and about 12. This mixing may be provided merely by pumping the component parts through recirculating pump.

Carboxylic acids other than those specifically enumerated can be employed in materials which can be effectively treated by the process of the present invention.

The preferred carboxylic acid for use in compositions to be treated by the process of the present invention is selected from the group consisting of oleic acid, the alkali metal salt of oleic acid, the quaternary amine salts of oleic acid, and mixtures thereof. Materials treated by the process of the present invention preferably contain carboxylic acid in an amount between about 0.1 and about 20% by weight of the total emulsion composition.

Aqueous paint overspray treatment emulsions which can be employed in the process of the present emulsions will generally contain significant concentrations of paint solids. While the amount of paint solid material contained in such emulsions will vary from paint spray application to paint spray application. A "spent emulsion", as the term is defined herein, is an aqueous paint overspray treatment emulsion which contains a concentration of material derived from the paint overspray sufficient to impair its ability to function as entrapment media for paint overspray. Spent emulsions treated by the process of the present invention can contain any concentration of paint solids. However, it is preferred for purposes of economy that the spent emulsion contain greater than 10% paint solids by total emulsion weight; with concentrations between about 10% and 30% by weight being preferred.

In the process of the present invention, the spent aqueous emulsion which contains paint solids may be broken by any suitable method. In the preferred embodiment, the emulsion is broken by the addition of a sufficient amount of a suitable acidic material to render the solution pH at a level between about 3 and about 7. The acidification media may be composed of any suitable non-corrosive, easily handled mineral acid such as those selected from the group consisting of sulfuric acid, nitric acid, hydrochloric acid, and mixtures thereof. The amount of acid employed is generally between about 0.05% and about 1% by total composition volume. Preferably, the acid is introduced in a concentrated acidic solution to render an acid content between about 500 and about 10,000 ppm.

In order to assure thorough contact between the acidifying media and the spent emulsion, the admixed material is thoroughly mixed. In the preferred embodiment, the admixture is mechanically agitated for an interval between about 45 minutes and about 75 minutes. Mixing can occur in a continuous manner or in any suitable mixing tank.

Once mixing has occurred, the acidified material is allowed to separate into its respective aqueous and organic layers. Separation may occur either through the action of gravity or may be induced or assisted by any of a number of means which would be known to one reasonably skilled in the art. The aqueous layer can be removed and further processed and clarified to render the water suitable for appropriate disposal or re-use. When reused, the water portion may be employed in reformulation of additional aqueous paint overspray treatment emulsion or other industrial processes as required.

The organic phase contains the non-volatile hydrocarbon and any other additives originally employed in the aqueous emulsion together with a major portion of the paint solids either suspended or solubilized therein. This organic phase can be further treated to separate the paint components from the emulsion components for recycle, reuse and/or more efficient disposal. In the preferred embodiment of the present invention, the organic phase is further processed to extract the non-volatile hydrocarbon derived from the spent aqueous emulsion together with any organic additives which may remain or be present in the organic phase. The method of subsequent processing will be described in greater detail subsequently.

The organic phase is typically a concentrate which contains a large quantity of materials to be reclaimed. In order to extract the desired organic material, such as the non-volatile hydrocarbon derived from the treatment emulsion for recycle and reuse from the paint solids, the organic material is contacted by a suitable hydrocarbon solvent. The hydrocarbon solvent employed is essentially miscible with the organic phase material. Suitable hydrocarbon solvents are those selected from the group consisting of straight chain alkanes having less than 11 carbon atoms, alcohols having less than 5 carbon atoms and mixtures thereof. In the preferred embodiment, the hydrocarbon solvent consists essentially of straight chain aliphatic material selected from the group consisting of hexane, heptane, octane, nonane, decane, and mixtures thereof. For purposes of economy, materials such as hexane and blends containing hexane as their major constituent are preferred.

In extracting the concentrate derived from the emulsion break step, the hydrocarbon solvent is employed in a ratio suitable to achieve separation of the paint material from the organic phase. In the preferred embodiment, the concentrate derived from the organic phase and the hydrocarbon solvent are admixed in a volumetric ratio between about 1:1 and about 2:1 hydrocarbon solvent to concentrate, respectively.

Without being bound to any particular theory, it is believed that the addition of the hydrocarbon solvent to the organic concentrate changes the solubility parameters of the concentrate sufficiently to render any solubilized paint insoluble in the admixed material and to further enhance the settling of any material suspended therein. The remaining liquid organic material which results is a mixture of aliphatic solvent and the organic components originally found in the emulsion.

The extraction process generally produces an organic sludge material which contains paint solids and an appreciable quantity of the non-volatile hydrocarbon derived from the paint treatment emulsion, as well as any emulsion additives. The sludge material which results from the first extraction can be further extracted to remove a further portion of the constituents of the emulsion material. The hydrocarbon solvent employed in the subsequent extraction is one which will accomplish efficient extraction of the non-volatile hydrocarbon and any emulsion additives from the organic sludge material. The hydrocarbon solvent is, preferably, one of the materials previously enumerated. For processing efficiency, it is preferred that the hydrocarbon solvent employed in the subsequent extraction be similar if not identical to the solvent employed in the first extraction.

In order to effect the subsequent extraction, it is preferred that the organic sludge material derived from the first extraction be admixed with sufficient hydrocarbon solvent to extract the desired hydrocarbon constituents and yield an essentially solid granular or particulate end material. The solid granular material so derived may be disposed of in any suitable manner or may be further processed as desired. In the preferred embodiment, the organic sludge material and hydrocarbon solvent extractant are admixed in a ratio between about 0.5:1 to about 1.5:1, hydrocarbon solvent to organic sludge material respectively.

The organic liquid resulting from the second extraction can be separately processed or, preferably, can be combined with the material derived from the first extraction for processing in the manner to be described. The combined or uncombined extract materials can be, optionally, filtered to remove any particulate material which remains suspended therein.

The extract material can then be separated into its respective organic phase concentrate fraction and hydrocarbon solvent fraction, preferably, by distillation at a temperature and vacuum sufficient to produce distinct fractions. The distillation temperature is, preferably, less than the decomposition temperature of the components derived from the paint overspray emulsion; particularly the non-volatile hydrocarbon. In the preferred embodiment, distillation occurs under sufficient vacuum to provide a distillation temperature less than about 160° F.

The distillation procedure yields a volatile aliphatic solvent fraction and a non-volatilized organic fraction. The non-volatilized organic fraction consists essentially of the organic constituents derived from the initial paint overspray treatment emulsion and may also contain trace amounts of high boiling constituents introduced from the paint solids during the treatment process of the present invention. It has been found that these trace materials, where present, will not impede the use of the non-volatile hydrocarbon in reformulation of paint overspray treatment emulsions.

The reformulated paint overspray emulsion may be prepared by any suitable method such as that described in U.S. Ser. No. 07/790,650 or other suitable methods as would be known to one reasonably skilled in the art.

What is claimed is:

1. A process for treating spent aqueous emulsion which includes a non-volatile hydrocarbon component, the spent aqueous emulsion containing paint solids, the process comprising the steps of:
    a) separating said emulsion into an organic phase and an aqueous phase;
    b) extracting organic material including said non-volatile hydrocarbon component from said organic phase with a quantity of a hydrocarbon solvent extractant sufficient to selectively solubilize the non-volatile hydrocarbon component employed in the aqueous emulsion to form an intermediate extract product; and
    c) separating the resulting intermediate extract product into a hydrocarbon solvent extractant fraction and a fraction containing the non-volatile hydrocarbon employed in the aqueous emulsion.

2. The process of claim 1 wherein said hydrocarbon solvent extractant is selected from the group consisting of straight chain alkanes having less than eleven carbon atoms, straight chain alcohols having less than five carbon atoms, and mixtures thereof.

3. The process of claim 2 wherein said hydrocarbon solvent extractant is selected from the group consisting of hexane, heptane, octane, nonane, decane, and mixtures thereof.

4. The process of claim 1 wherein said organic material and said hydrocarbon solvent extractant are admixed in a ratio between about 1:1 and about 2:1, hydrocarbon solvent to organic material, respectively.

5. The process of claim 1 wherein said extraction step produces an organic sludge material at least partially insoluble in said hydrocarbon solvent extractant, said organic sludge material consisting essentially of a major portion of non-volatile organic material derived from the aqueous emulsion and paint solids.

6. The process of claim 5 further comprising the step of contacting said sludge material with additional quantities of said hydrocarbon solvent extractant sufficient to extract at least a portion of the non-volatile organic material from said sludge.

7. The process of claim 5 wherein said sludge and said hydrocarbon solvent are admixed in a ratio between about 0.5:1 and about 2:1, hydrocarbon solvent to sludge, respectively.

8. The process of claim 5 wherein said hydrocarbon solvent extractant is selected from the group consisting of straight chain alkanes having less than eleven carbon atoms, straight chain alcohols having less than five carbon atoms, and mixtures thereof.

9. The process of claim 8 wherein said hydrocarbon solvent extractant is selected from the group consisting of hexane, heptane, octane, nonane, decane, and mixtures thereof.

10. The process of claim 1 wherein said separation of said extract product into a hydrocarbon solvent fraction and a fraction containing nonvolatile hydrocarbon component derived from the emulsion comprises the step of distilling said extract product at a temperature less than about 160° F. to produce a volatilized hydrocarbon fraction and a residual fraction having a Tag closed cup flash point above about 140° F.

11. The process of claim 1 further comprising the step of contacting the spent emulsion with an acidification media in sufficient quantity to achieve separation of the emulsion into an aqueous phase and an organic phase, wherein the spent emulsion is contacted with said acidification media prior to contact by said hydrocarbon solvent extractant.

12. The process of claim 11 wherein said acidification media is added in an amount sufficient to provide a solution pH between about 4 and about 7.

13. The process of claim 11 wherein said acidification media is an inorganic acid selected from the group consisting of sulfuric acid, hydrochloric acid, nitric acid, and mixtures thereof.

14. The process of claim 11 further comprising the steps of:
agitating the acidified emulsion for an interval sufficient to assure thorough mixture of the acidification media and emulsion; and
allowing the agitated material to sit undisturbed for an interval of time sufficient to permit separation of said organic phase from said aqueous phase.

15. The process of claim 14 further comprising the steps of:
removing any residual insoluble organic material from said aqueous phase derived from breaking the spent emulsion; and
employing at least a portion of said aqueous phase in said reclaimed emulsion material.

16. The process of claim of claim 1 wherein said spent emulsion consists essentially of:
a. an effective amount of an essentially non-volatile hydrocarbon selected from the group consisting of alcohol esters, alcohol ester derivatives, and mixtures thereof, the hydrocarbon being capable of dissolving paint and remaining essentially insoluble and non-reactive in an aqueous media;
b. water; and
c. an amount of paint solid material contained therein sufficient to impair performance of the aqueous paint overspray treatment emulsion.

17. The process of claim 16 wherein the paint solid material is present in the emulsion in an amount between about 10% and about 30% by total emulsion weight.

18. A process for reconstituting aqueous emulsions used to treat paint overspray which contain:
a) an essentially non-volatile hydrocarbon selected from the group consisting of alcohol esters, alcohol ester derivatives, and mixtures thereof, the hydrocarbon being capable of dissolving paint and remaining essentially insoluble and non-reactive in an aqueous media;
b) water; and
c) paint solid material in an amount sufficient to impair the performance of the overspray treatment emulsion, the process comprising the steps of:
breaking the paint overspray treatment emulsion into its resulting aqueous and organic phases;
admixing said resulting organic phase with a quantity of a hydrocarbon solvent extractant sufficient to selectively extract a substantial portion of the non-volatile hydrocarbon employed in the aqueous emulsion into said hydrocarbon solvent extractant, said admixing step producing an organic sludge consisting essentially of paint solids and non-volatile hydrocarbon derived from the paint overspray treatment emulsion;
admixing said organic sludge with a quantity of a hydrocarbon solvent extractant sufficient to selectively solubilize the non-volatile hydrocarbon contained in said sludge into said hydrocarbon extractant;
separating said hydrocarbon extractant containing said non-volatile hydrocarbon into a first hydrocarbon solvent extractant fraction and a second fraction containing the non-volatile hydrocarbon; and
forming an aqueous paint overspray treatment emulsion using said second fraction.

19. The process of claim 18 wherein said organic phase and said hydrocarbon solvent extractant are admixed in a volumetric ratio between about 1:1 and about 2:1, hydrocarbon solvent to organic phase, respectively.

20. The process of claim 19 wherein said hydrocarbon solvent extractant is selected from the group consisting of octane, nonane, decane, and mixtures thereof.

21. The process of claim 18 wherein said essentially non-volatile hydrocarbon is selected from the group consisting of 2,2,4-trimethyl-1,3-pentanediol monoisobutyrate, 2,2,4-trimethyl-1,3-pentanediol diisobutyrate, and mixtures thereof.

22. The process of claim 18 wherein said separation of the organic phase/hydrocarbon solvent mixture into a first hydrocarbon solvent extractant fraction and a second fraction containing said non-volatile hydrocarbon comprises the step of distilling said organic phase/hydrocarbon solvent extractant mixture to produce a volatilized hydrocarbon fraction and a residual organic phase fraction having a Tag closed cup flash point above about 140° F.

23. The process of claim 18 wherein the emulsion breaking step comprises the steps of:
contacting the paint overspray treatment emulsion with a quantity of an acidification media selected from the group consisting of sulfuric acid, hydrochloric acid, nitric acid, and mixtures thereof sufficient to achieve a pH between about 4 and about 7;
agitating said acidified emulsion for an interval of time sufficient to assure thorough mixing of said acidification media in said paint overspray treatment emulsion; and
allowing said agitated material to sit undisturbed for an interval sufficient to permit separation of said organic phase from said aqueous phase.

24. A process for treating an aqueous paint overspray treatment emulsion consisting essentially of:
a) an essentially non-volatile hydrocarbon selected from the group consisting of 2,2,4-trimethyl-1,3-pentanediol monoisobutyrate, 2,2,4-trimethyl-1,3-pentanediol diisobutyrate, and mixtures thereof;
b) water; and
c) paint solids material present in an amount between about 10% and about 30% by total emulsion volume, the process comprising the steps of:
admixing the spent emulsion with an acidification media for an interval sufficient to assure thorough mixture of the two materials, said acidification media added in an amount sufficient to provide a solution pH between about 4 and about 7;
allowing said admixed material to remain undisturbed for an interval sufficient to permit separation of said emulsion into an organic phase and an aqueous phase;
admixing said separated organic phase with a first quantity of a hydrocarbon solvent extractant in an amount sufficient to extract a substantial portion of the non-volatile hydrocarbon derived from the paint overspray treatment emulsion into said hydrocarbon solvent extractant, said hydrocarbon solvent extractant selected from the group consisting of straight chain alkanes having less eleven carbon atoms, straight chain alcohols having less than five carbon atoms, and mixtures thereof, said admixing step resulting in the production of an organic sludge material consisting essentially of paint solid material and non-volatile hydrocarbon derived from the overspray treatment emulsion;
admixing said organic sludge material with a second quantity of said hydrocarbon solvent extractant sufficient to extract a substantial portion of the non-volatile hydrocarbon present in the organic sludge material into said second quantity of said hydrocarbon solvent extractant;
combining said first and said second hydrocarbon solvent extractant quantities;
distilling said combined hydrocarbon extractant quantities to produce a volatilized hydrocarbon solvent extractant fraction and a residual organic fraction having a Tag closed cup flash point above about 140OF consisting essentially of the non-volatile hydrocarbon derived from the paint overspray treatment emulsion; and
admixing said residual organic fraction with sufficient water to form a reclaimed aqueous emulsion for treatment of paint overspray.

25. The process of claim 24 wherein said organic phase derived from the paint overspray treatment emulsion and said first quantity of hydrocarbon solvent extractant are admixed in a volumetric ratio between about 1:1 and about 2:1, hydrocarbon solvent to organic phase, respectively.

26. The process of claim 24 wherein said organic sludge material and said second quantity of said hydrocarbon solvent extractant are admixed in a volumetric ratio between about 0.5:1 and about 2:1, hydrocarbon solvent to organic sludge material, respectively.

27. The process of claim 24 wherein said distillation step proceeds at a temperature below about 140° C. under sufficient vacuum to selectively volatilize said hydrocarbon solvent extractant.

28. The process of claim 24 wherein said hydrocarbon solvent extractant is selected from the group consisting of hexane, heptane, octane, nonane, decane, and mixtures thereof.

* * * * *

UNITED STATES PATENT AND TRADEMARK OFFICE
CERTIFICATE OF CORRECTION

PATENT NO. : 5,254,256
DATED : October 19, 1993
INVENTOR(S) : Edwin C. Zuerner, Robert R. Patzelt and Norman Foster It is certified that error appears in the above-indentified patent and that said Letters Patent is hereby corrected as shown below:

On the title page, item [75],
In the designation of Inventors, after "Robert" please delete "R. Petzelt" and insert --R. Patzelt--.

Signed and Sealed this

Fifth Day of January, 1999

Attest:

*Attesting Officer*

*Acting Commissioner of Patents and Trademarks*